Patented Aug. 11, 1936

2,050,428

UNITED STATES PATENT OFFICE 2,050,428

INSULATING WAX

Sterling H. Diggs, Robert E. Beard, and James M. Page, Jr., Casper, Wyo., assignors to Standard Oil Company, Chicago, Ill., a corporation of Indiana No Drawing. Application November 2, 1931, Serial No. 572,720

5 Claims. (Cl. 196—19)

This invention relates to a new adhesive wax composition and a method for preparing the same.

The object of this invention is to produce an adhesive wax that will adhere tenaciously to metal surfaces, particularly highly polished metal surfaces, and is adapted to be used for electrical insulating purposes.

A further object is to produce an adhesive wax which may be used on wires for insulating purposes and which is sufficiently ductile to permit the wires to be bent without cracking the wax coating.

A still further object is to provide a high melting insulating wax that will not melt in hot weather, and which is adapted to be cooled to freezing temperatures without cracking and pulling away from the surfaces to be insulated.

Paraffin wax, which is a solid material that precipitates from a high boiling petroleum distillate, when cooled to temperatures near freezing, has satisfactory electrical insulating properties but it does not possess the property called "tackiness" which enables it to stick to metals. When cooled, paraffin wax contracts and pulls away from the metal surface and thereby becomes worthless as an electrical insulator.

Petrolatum wax is prepared from undistilled residues of crude oil. The residues or bottoms are treated with sulfuric acid to remove the asphaltic materials, the oil resulting from the acid treatment is neutralized, filtered, and chilled to temperatures near freezing, whereupon the crude petrolatum wax precipitates. The term "crude petrolatum wax" is used throughout the specification and claims to designate a composition prepared substantially as above described. Crude petrolatum wax so obtained is unsatisfactory as an electrical insulating material because it has the undesirable property of contracting and pulling away from metal surfaces when cooled and leaving voids which render the coating worthless as an electrical insulator. Also, it does not possess the requisite tackiness or ductility. The method for separating paraffin wax and crude petrolatum wax from oil is well known and is not a part of this invention.

We have found a new adhesive wax composition which is different from both paraffin and petrolatum waxes and which possesses the peculiar property called tackiness to an unusual degree. This wax is very ductile, exhibits great tenacity for metals, and does not pull away from metallic surfaces when cooled. The term "adhesive wax" is used throughout the specification and claims to designate our new wax composition.

The relative adhesiveness of paraffin wax, crude petrolatum wax, and our adhesive wax can be determined by the adhesiveness test herein described and referred to as the "Page adhesiveness test." The test is conducted by means of a polished tin surfaced receptacle about three inches in diameter and one-fourth inch deep. In carrying out the test, the receptacle is filled about two-thirds full of molten wax and then cooled to 32° F. It will be noted that the paraffin wax and petrolatum wax contract and pull away from the inner surfaces of the receptacle when cooled and are easily removed therefrom, whereas the adhesive wax prepared according to our invention exhibits excellent adhesive properties for metals and will remain tightly and uniformly fixed to the sides of the metallic pan when cooled. The term "high adhesiveness" is used throughout the specification and claims to describe a wax which passes the above adhesiveness test.

Our new adhesive electrical insulating wax, which exhibits the property of adhering tenaciously to metals, is prepared from the low melting amorphous compounds normally occurring in petrolatum wax; these low melting compounds are prepared by fractionally precipitating and removing the high melting crystalline portion of the petrolatum wax from the amorphous portion of petrolatum wax. The crude petrolatum wax to be treated is dissolved in a suitable solvent, for example, ethylene dichloride or naphtha, and cooled to the temperature at which the high melting crystalline fraction precipitates; it usually precipitates within the range of 100° to 70° F. The precipitate is removed, and the resulting solution, comprising the amorphous wax, is cooled to the temperature at which the adhesive amorphous wax fraction precipitates; it usually separates out within the range of 40° to 0° F. This second fraction of wax may be used as our adhesive wax composition without further purification, or it may be reprecipitated for the purpose of producing a whiter product or a product with a sharper and slightly higher melting point.

Example I

A 20% solution of crude petrolatum wax in naphtha of 54° A. P. I. gravity is cooled to about 70° F. and centrifuged. A high melt crystalline wax, which melts above 169° F. is removed, and the remaining solution is cooled to about 20° F. and again centrifuged. The second centrifuging removes a wax that melts at about 147° F. and possesses high adhesiveness. This fraction is our new adhesive wax. The adhesive wax may contain as much as 21% of oil, but the oil content may be reduced by reprecipitating the fraction from naphtha, by pressing, or any other suitable means. As the oil content is reduced, there is a slight increase in the melting point of the wax. If the oil content is reduced to about 18% the melting point will be raised to about 151° F.

Other grades of naphtha can be satisfactorily used in the above example as a solvent. Also we may use ethylene dichloride or a mixture of acetone and benzol instead of naphtha. In carrying out the process set forth in the above example we have found that centrifuging at about 70° F. removes substantially all of the high melting fraction, which melts above 169° F. Other temperatures could be used so long as the first fraction that is removed does not contain a large quantity of the amorphous wax that exhibits great adhesive properties for metals. Also, the second precipitation may be carried out at a temperature other than 20° F. We have obtained a satisfactory product within the range of 40° F. to 0° F. Instead of separating the fractions by centrifuging, as set forth in the above example, we may remove the precipitate by any suitable method, for example, by cold settling, filtering, or vacuum distillation. Instead of using crude petrolatum wax, as in the above example, we may use any wax that contains the amorphous adhesive wax.

The physical properties of one form of our adhesive wax are as follows:

| | |
|---|---|
| Color N. P. A. scale | 2½ to 3 |
| Melting point A. S. T. M | 151° F. |
| Specific gravity at 60°/60 F. | 0.933 |
| Breakdown test in liquid state | O. K. at 25,000 volts |
| Corrosion test copper strip | None |
| Percent oil in product | 18 |
| Adhesion to polishing metals | High |

The melting point of our adhesive wax will vary slightly with the type of crude oil from which the crude petrolatum wax is prepared. The petrolatum wax from Salt Creek crude oil or similar oils will yield an adhesive wax suitable for insulating purposes that melts within the range of 142° to 159° F. when first precipitated. This adhesive wax, which is precipitated by cooling to the lower temperature (20° F.), may contain from 15 to 25% of oil. A portion of this oil may be removed by pressing or by reprecipitation. By removing a small percentage of the oil, the melting point of the adhesive wax will be raised somewhat, but the oil content of the wax does not affect the tackiness or adhesiveness of the product. The tackiness is inherent in the hydrocarbon wax itself.

Although the present invention has been described in connection with the details of a specific example, it should be understood that such details are not intended to be construed as limitations upon the scope of the invention except insofar as included in the accompanying claims.

We claim:

1. An adhesive electrical insulating petrolatum wax prepared from Salt Creek crude oil which melts at a temperature within the range of 142° F. to 159° F. and possesses the property, at temperatures as low as 32° F., of adhering to polished surfaces without contracting.

2. The process of preparing an adhesive wax composition from a naphtha solution of a Salt Creek crude petrolatum wax, which comprises cooling the solution to about 70° F. until the fraction of high melting crystalline wax precipitates from the solution, separating the precipitated wax from the remaining solution, further cooling the remaining solution and separating an amorphous wax exhibiting high adhesiveness and having a melting point between 142 and 159° F.

3. An electrical insulating hydrocarbon wax separated from Salt Creek crude petrolatum wax, which melts within the range of 142° F. to 159° F., adheres to smooth surfaces at a temperature as low as 32° F. and does not contract or crumble at temperatures as low as 0° F.

4. An adhesive electrical insulating petrolatum wax prepared from crude oil of the Salt Creek crude oil type, said petrolatum wax melting at a temperature within the range of 142° F. to 159° F. and possessing a property at a temperature as low as 32° F. of adhering to polished surfaces without contracting.

5. The process of preparing an adhesive wax composition from a solution of a crude petrolatum wax obtained from crude oils of the Salt Creek crude oil type which comprises cooling the solution to about 70° F. until the fraction of high melting crystalline wax precipitates from the solution, separating the precipitated wax from the remaining solution, further cooling the remaining solution and separating an amorphous wax exhibiting high adhesiveness and having a melting point between 142 and 159° F.

STERLING H. DIGGS.
ROBERT E. BEARD.
JAMES M. PAGE, Jr.